Aug. 1, 1939.    W. A. COOK    2,168,299
INSULATING PARTITION
Filed June 15, 1937
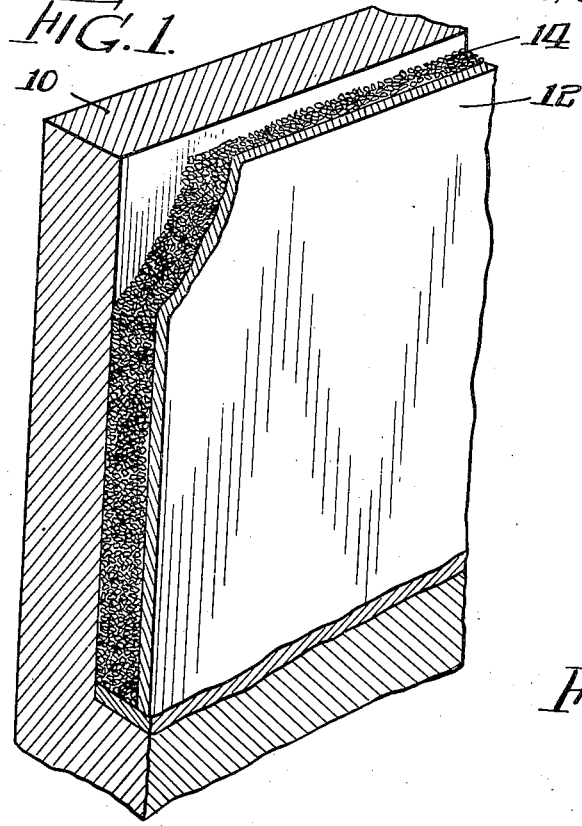
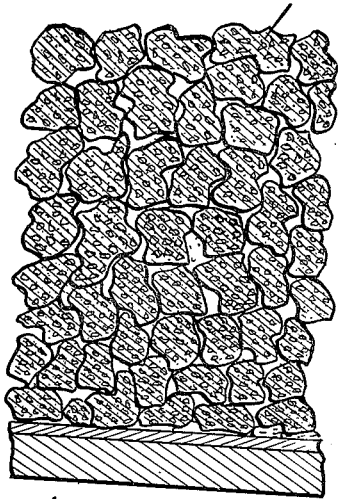
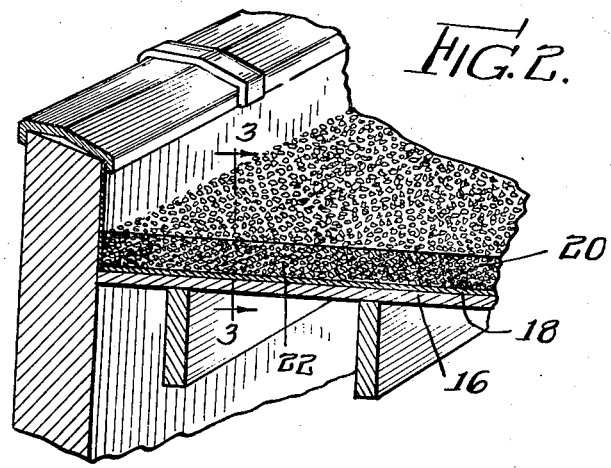
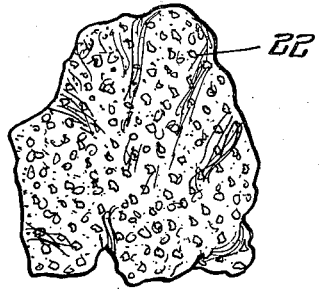
INVENTOR.
William Arthur Cook
BY: Cox & Moore
ATTORNEYS.

Patented Aug. 1, 1939

2,168,299

UNITED STATES PATENT OFFICE 2,168,299

INSULATING PARTITION

William Arthur Cook, Chicago, Ill.

Application June 15, 1937, Serial No. 148,323

5 Claims. (Cl. 20—4)

The present invention relates to the art of insulating against the passage of heat, more particularly to a partition suitable for resisting heat transfer.

It is an object of this invention to provide an improved insulation in novel form which is extremely resistant to the passage of heat and is unaffected by moisture, wear and the like, and is light in weight; a new and improved insulating unit which may be readily provided in any preformed structure without recourse to special methods of application and deposition, and which may be simply poured into place in dry form to produce a relatively unitary interlocking structure; a fireproof insulating unit which is resistant to the inert in character and which is resistant to the absorption of moisture and completely unaffected by weather conditions; an improved heat insulating material or partition formed of metallurgical slag which will resist the infiltration or passage of air and/or moisture therethrough.

At the present time there is a distinct demand for an insulating material applicable to general types of structures which possesses a high insulating efficiency and is adaptable to general conditions of use. While, as is well known, all structural materials possess some insulating effect, the structural arts demand a bulk product which need possess no mechanical strength or structural properties, and modern practice comprises the provision of a suitable space in structures to be insulated to accommodate and hold the insulating material. Various bulk insulating materials are now in use, probably the most popular of which is a fibrous or wool-like material that comprises threads of a mineral substance. This product, while possessing a very good insulating efficiency, nevertheless possesses many disadvantages which render its use undesirable; for example, the fibres tend to absorb considerable moisture in the matted or blanket-like aggregate. This effect is probably enhanced by the fact that the insulating aggregate itself actually permits the passage of air and consequently moisture therethrough. This is due to the fact that the small spaces betwen the fibres constitute continuous passages through the mass. In itself this constitutes a considerable detriment in that substantially all structures in which it is employed, particularly those exposed in any measure to weather conditions or to temperature variations, in the presence of a relatively moisture-laden atmosphere, are deteriorated in varying degrees. For example, in employing these products interiorly of the walls and floors in a wooden structure, the frame and joists, being subjected to varying degrees of humidity throughout their section, are prone to warp and damage the entire structure. Moreover, the insulating product itself is gradually destroyed by these normal deteriorating influences. This material, having absorbed or soaked up a quantity of moisture, is further subject to freezing under low temperature conditions.

According to the present invention certain expanded slag products, treated in a novel manner to produce an improved product, may be fabricated into insulating partitions or layers in the form of novel interlocking granules which tend to obviate the difficulties inherent in the prior art.

The expanded slag product, used in the present invention, may be produced in various ways from metallurgical slags, preferably blast furnace slag. In particular, it has been discovered that the expanded product produced by steam treatment of blast furnace slag has great utility. In the formation of this material the molten slag is subjected to the action of steam as it cools, desirably being stirred, agitated, beaten or centrifuged meanwhile.

In proceeding in accordance with the preferred embodiment of the invention, molten blast furnace slag, preferably slag resulting from operation of the blast furnace in the manufacture of basic iron, is run into direct contact with steam and agitated during the resulting cooling. In one form of procedure the slag is caused to flow directly from the blast furnace onto a series of rotating discs which are fed with water, and provided with vanes which tend to break up the slag stream and throw it against a series of abutments. The added moisture is immediately converted to steam so that the beating or agitation of the slag occurs in an atmosphere of steam. Thus the slag is at the same time subjected to the cooling influences of the steam and the action of the discs and vanes which cause agitation of the mass as well as a beating action when the centrifuged portions are impacted against the walls of the device. The amount of moisture added is carefully controlled to give a light, highly expanded product which retains, at the same time, considerable strength and resistance to compressive stresses and abrasion. In any event, the amount of water used in this process is never sufficient to leave the final product in a moist state, when cooled down to normal temperature.

While this constitutes the preferred procedure, the invention is applicable to the use of expanded slags which are agitated in various ways during cooling, and also those products wherein an equivalent result is achieved with little or no accompanying agitation, or by causing the slag to swell under the application of steam under pressure. The product produced according to this preferred step is in the form of a very light-colored mass of pieces, quite irregular in exterior shape and varying in size from small fines to a considerable proportion of relatively large chunks. Closely examined, the entire mass will be seen to possess a highly cellular form. Under some magnification it will be apparent that the material is glassy, vitreous and impervious in nature, and that the cells or minute internal spaces do not intercommunicate, but are separated by intervening walls, which is conceived to be responsible for the completely impervious and nonabsorptive nature of the product.

The present random mass or aggregate, as produced above, while possessing some heat insulating qualities, particularly in comparison with the usual structural materials, nevertheless lacks the efficiency of a really high-grade bulk insulating product of the type and for the purposes discussed above. So, also, when the expanded mass is manufactured into blocks or structural units, for example with the addition of a hydraulic cement, the heat insulating properties are further detracted from. Moreover, these products are entirely unsuitable for use in connection with structures having a space for insulating mass, in view of their relatively great mass which would increase the weight of the structure and demand a special variation in design which, of course, in the present art, would seriously impair or prohibit practical usefulness of the product.

In accordance with the present invention the aggregate of expanded slag is formed into granules of carefully graded size and proportions. This may be done by passing the cool, dry, expanded slag product through crushing rolls or any suitable type of crushing machinery, and later carefully grading the product by a series of screens to remove all fine particles and also all large pieces or chunks greater in size than a granular form.

According to a broad embodiment of the invention, after the crushing operation the particles are carefully graded to remove all pieces which will pass through a $\frac{1}{16}$ inch mesh screen, and also all pieces which will not pass a ½ inch mesh screen. On the other hand, a greatly improved product is produced by eliminating all particles except those which will pass through a ⅛ inch mesh screen and consisting of no larger sizes than those which will pass through a ⅜ inch mesh screen.

According to the preferred embodiment of the invention a carefully graded granular product is manufactured in the above manner such that the granules are all held by a $\frac{1}{16}$ inch mesh screen and pass a ¼ inch mesh screen. For general use in the above relationship the specific preferred grade is of great utility and value and equals or approaches in heat insulating qualities the finest bulk insulating materials available at the present time, at the same time having a sufficiently low weight factor to be useful in substantially any structure without variation in its mechanical design. It has been found possible, also, to employ a product consisting of relatively large particles of expanded slag, for example those held by a ¼ inch mesh or ⅜ inch mesh screen and passing through a ½ inch mesh screen. These relatively large grained products possess the virtue of a very low weight factor.

The particles produced are quite individual in character, as indicated by the fact that the mesh sizes denoted are no mathematical representation of their exact size. Apparently due to the irregular and elongated, sharp structure, the particles will engage into the meshes of the screen and those started will pass therethrough endwise or diagonally. This particular formation of the grains is believed responsible for the tendency of the insulating walls made from the product to interlock into a fixed and permanent unit, as will be hereinafter more fully described.

The product may be used in various ways; for example, in a structure an insulating space may be left between opposed walls in a known manner and the product poured thereinto, preferably with some jarring or agitation of the device when the space provided is relatively small. For example, in the case of refrigerator boxes, the device may be tapped or jarred until the insulating space is completely filled with particles. It has been discovered, however, in accordance with the present invention, that the particles of the instant product in effect interlock together to produce a substantially unitary partition wall. For example, after situating the mass in the insulating space in the manner defined, further jarring of the structure will fail further dislodgment or settling of the unit. This renders the invention particularly adaptable to the insulation of vehicles or to structures which are liable to be transported. Moreover, the interlocking of the mass contributes in a large degree to the general impermeability of partitions made in the above manner to the infiltration or passage of air, moisture and the like. This action, combined with the absolute impermeability to moisture and air of the individual pieces of material, contributes to a new and improved result in the art. Alternatively the granular product may be applied to preformed structures by being blown into the walls with the assistance of a draft of air or the like, or may be conveyed in any equivalent known manner into locations where simple pouring in the dry state is unfeasible. The term "walls", as used in the present specification, is not limited to vertical partitions, but includes ceilings, roofs, or partitions of various shape, inclination and configuration.

The product may be employed in various other ways; for example, due to the novel and resistant properties of the present product it is not essential to provide an interior space in a structure for the accommodation of the insulating mass. In insulating roofs, and particularly relatively flat roofs, extremely good results are obtained by merely spreading a uniform layer of the product on the surfaces of the roof in such a manner as to cause a general interlocking of the particles. For general purposes it is not essential to further attach this layer to the structure in view of the properties aforementioned, and the resistance to deterioration by weather is such that no additional protection is necessary. The interlocking character of the grains permits a high angle of repose and causes the particles in the layer to remain undisturbed even though exposed to adverse weather conditions and high winds. Extremely valuable results from the application of the material to roofs in this manner have been attained which indicate that the normal heat insulating qualities of the material are considerably enhanced by the resistance to the absorption of radiant which it is conceived may be due to the very light color as well as glassy surfaces on the particles. The insulating roof coverings produced in this manner may be of any desired thickness, for example, one or two inches in depth, and in exceptional cases may be maintained in place by a thin layer of adhesive such as bitumin or water-glass which may be first applied to the roof and the particles spread thereover, or else applied later to cover the granules. Various other modes of application will be apparent to those skilled in the art after considering the above disclosure.

Illustrative embodiments of the present invention described above are shown more specifically in the drawing in which:

Figure 1 is a perspective view of a portion of an insulating partition constructed in accordance with the present invention.

Figure 2 is a perspective view of a portion of a roof structure arranged in accordance with the present invention.

Figure 3 is a detail sectional view taken on the line 3—3 in Figure 2.

Figure 4 is an elevational view of a characteristic discrete granule of expanded slag.

In Figure 1, the numerals 10 and 12 represent opposed walls having a space therebetween in which is arranged a unitary interlocking mass of granules of expanded slag 14. All of the granules are of carefully graded size, such as defined above.

In Figure 2, the numeral 16 represents a supporting roof structure which may have a layer of roofing material 18 superposed thereon. Over this is superposed a layer 20 of uniform thickness consisting of an interlocking mass of discrete granular particles, each of the granular particles being designated by the numeral 22. Attention is particularly directed to the fact that the layer is of substantial thickness in which the particles are, not only interlocking, but wherein the thickness is of such a degree relative to the size of the granules that a plurality of superposed granules exist at all transverse sections.

Figure 3 illustrates the interlocking nature of the integral, granular, cellular particles 22 employed in accordance with the preferred embodiment of the present invention which granules by their nature tend to interlock in the manner shown. It is to be particularly noted that the mass is free from any interparticulate material, such as fines or cementing material.

The present invention provides a new and improved insulating partition unit which produces a unitary structure of the highest insulating efficiency and is resistant to mechanical shocks and all deteriorating or dearranging influences. Moreover, the present insulating means completely obviates the moisture problem since it not only substantially completely refuses to absorb or hold moisture, but is completely unaffected by any accumulation or contact therewith due to outside influences. Thus, repeated wetting or subjection openly to weather conditions apparently is no detriment nor does the inert character of the product vary under these conditions in such a way as to in any way harm the surrounding structure. As a result the invention is particularly adaptable to use in the insulation of pipes and machinery in the refrigerating art which are prone to the protection of high humidity and dampness. The rotting and deterioration of insulating materials generally present under these conditions is completely absent when operating in accordance with the present invention.

Moreover, the present structures, while not affected by normally excessive degrees of heat, are quite fireproof, and fire-resisting, rendering them equally useful in the insulation of furnaces, boilers and homes. The surface resistance to the absorption of radiant energy due to the light color and vitreous surfaces of the particles are likewise believed responsible in a great measure for the low rate of energy transmission between the cells or intraparticulate cavities. Moreover, the present insulating unit is extremely valuable in providing a quite effective impediment to the passage or flow of air, and provides a relatively unitary insulating wall or partition wherein the particles are interlocked or intermeshed by their innate shape and/or their somewhat hydraulic properties. The present invention, moreover, is of considerable advantage in providing an insulating partition having, at the same time, the general advantages of loose bulk insulating material with those of a structural unit, and furthermore, wherein the voids or cells in the mass are individually sealed and do not communicate to transmit or absorb fluids of any kind.

It is thought that the invention and numerous of its attendant advantages will be understood from the foregoing description, and it is obvious that numerous changes may be made without departing from the spirit or scope of the invention, or sacrificing any of its attendant advantages; and the right is hereby reserved to make all such changes as fairly fall within the scope of the following claims.

Having thus described my invention, what I claim as new and desire to secure by United States Letters Patent is as follows:

1. An insulating partition consisting substantially entirely of a unitary interlocking mass of discrete granular particles of expanded slag, said granular particles all being of a carefully graded size such as to be held by a 1/16 inch mesh screen and passing through a substantially 1/2 inch mesh screen, each of the particles being separate and unattached to the other particles of the mass.

2. An insulating partition consisting of a unitary interlocking mass of granular particles of metallurgical blast furnace slag which has been subjected to cooling by steam vapor under the influence of beating and agitation while in the molten condition, said granular particles all being of a carefully graded size such as to be held by a 1/16 inch mesh screen and passing through a substantially 1/2 inch mesh screen, each of the particles being separate and unattached to the other particles of the mass and being supported by substantially rigid supporting wall means.

3. In a roof structure or the like comprising a relatively flat supporting surface, a layer of generally uniform thickness arranged on said exterior surface and consisting of an interlocking mass of discrete granular particles of expanded slag, said layer being at least 1 inch in thickness and consisting substantially completely of granular particles held by a 1/16 inch mesh screen, and comprising at all transverse sections therethrough a plurality of superposed discrete granular particles, the granular particles being free from any bonding or cementing attachment.

4. An insulating partition consisting of a unitary interlocking mass of granular particles of expanded slag, said granules consisting substantially entirely of a carefully graded size such as to be held by a substantially $\frac{1}{16}$ inch mesh screen and passing through a screen of substantially $\frac{1}{2}$ inch mesh, the major portion of the product consisting of granular particles held by a $\frac{1}{8}$ inch mesh screen, each of the particles being separate and unattached to the other particles of the mass whereby to provide between the individual particles insulating spaces substantially free from conducting material.

5. An insulating partition consisting of a pair of spaced continuous wall sections and a unitary interlocking mass of granular particles of expanded cellular slag arranged in the space between said walls, said granular particles consisting substantially completely of particles of generally uniform size from which substantially all relatively large and small particles have been removed and consisting substantially entirely of granular particles held by a $\frac{1}{16}$ inch mesh screen and passing through a screen of about $\frac{1}{2}$ inch mesh, each of the particles being separate and unattached to the other particles of the mass and the interparticular space being substantially free of solid conducting material.

WILLIAM ARTHUR COOK.